US006934468B2

(12) United States Patent
Kim

(10) Patent No.: US 6,934,468 B2
(45) Date of Patent: Aug. 23, 2005

(54) BRUSHLESS DC MOTOR AND CIRCUIT FOR CONTROLLING THE SAME

(75) Inventor: Sang Uk Kim, Seoul (KR)

(73) Assignee: G & W Technologies Inc. (KR)

( * ) Notice: Subject to any disclaimer, the term of this patent is extended or adjusted under 35 U.S.C. 154(b) by 0 days.

(21) Appl. No.: 10/497,061

(22) PCT Filed: Nov. 28, 2002

(86) PCT No.: PCT/KR02/02231

§ 371 (c)(1),
(2), (4) Date: May 27, 2004

(87) PCT Pub. No.: WO03/047072

PCT Pub. Date: Jun. 5, 2003

(65) Prior Publication Data

US 2005/0007043 A1 Jan. 13, 2005

(30) Foreign Application Priority Data

Nov. 29, 2001 (KR) .................................... 2001-0074909

(51) Int. Cl.[7] .................................................. H02K 3/28

(52) U.S. Cl. ....................... 388/803; 388/816; 310/180; 310/184; 310/185; 310/198

(58) Field of Search ................................ 310/180, 184, 310/185; 388/803, 816

(56) References Cited

U.S. PATENT DOCUMENTS 3,922,559 A * 11/1975 Migeon ....................... 307/64
4,550,267 A * 10/1985 Vaidya ....................... 310/184
5,489,831 A * 2/1996 Harris ........................ 318/701
5,825,113 A * 10/1998 Lipo et al. .................. 310/181
6,049,149 A * 4/2000 Lin et al. .................. 310/68 R
6,359,401 B1 * 3/2002 Garcia-Sinclair et al. ... 318/254
6,710,581 B1 * 3/2004 Lee ............................ 322/39

FOREIGN PATENT DOCUMENTS

JP 03-150058 6/1991
JP 08-331815 12/1996
JP 2000-152589 5/2000
KR 10-1999-013313 2/1999
KR 20-0235877 10/2001

* cited by examiner

*Primary Examiner*—Rita Leykin
(74) *Attorney, Agent, or Firm*—Keusey, Tutunjian & Bitetto, P.C.

(57) ABSTRACT

Disclosed is a multiphase brushless DC motor of a concentrated winding type having shunt connection, and a control circuit. The brushless DC motor includes a rotor made up of a permanent magnet with M number of poles, and a stator operating in K number of phases by means of windings wound on N number of teeth, wherein the plurality of windings having the same excitation phases wound on the teeth, are each maintained in shunt connection so as to improve driving torque and a rotational speed. A brushless DC motor includes a switching section having a plurality of upper switching devices and a plurality of lower switching devices connected with each other in series. Each of the windings is connected between a common joint between the upper and lower switching devices, and a common joint between a lower power supply voltage and a plurality of upper power supply voltages.

2 Claims, 10 Drawing Sheets

BRUSHLESS DC MOTOR AND CIRCUIT FOR CONTROLLING THE SAME

FIELD OF THE INVENTION

The present invention relates to a brushless DC (BLDC) motor. More particularly, the present invention is directed to an independent multiphase BLDC motor of a concentrated winding type having a shunt connection, and a circuit for controlling such a motor.

BACKGROUND ART

Generally, brushless DC (BLDC) motors are designed so that a rotor is made up of a permanent magnet and a stator is made up of an armature with a coil wound around a core. The BLDC motors are classified into a sine-wave current driving type and a square-wave current driving type according to the wave profile of current supplied to the armature. A BLDC motor is also called a permanent magnet motor, and has a broad application as a variable speed driving unit in the high performance driving field, because the BLDC motor has a counter-electromotive force wave profile of a trapezoidal shape, as well as a light weight, a compact size, a high efficiency, a small inertia and a simple driving circuit as compared with an induction motor having the same output power.

However, a BLDC motor generates pulsating or ripple torque and a resultant mechanical vibration due to cogging torque together with driving torque for rotation, overlapping between phases, a spatial harmonic wave or the like, which lead to a reduced efficiency. Here, cogging torque is generated by interaction between stator slots and rotor magnets. Cogging torque can be significantly reduced by skewing the stator slots or rotor magnets by a pitch of one slot. Additionally, the pulsating or ripple components caused by mutual torque generated at the regions where torques for each phase are overlapped can be constrained by exciting a stator current sophisticatedly.

Typical BLDC motors have a plurality of windings, which function as an electric circuit, inserted into a stator and/or a rotor. According to the type of winding, BLDC motors are classified into a concentrated winding type, in which independent coils are wound around each tooth formed on the steel core, and a distributed winding type in which a plurality of windings are distributed into the corresponding teeth to form one phase. Of them, the concentrated winding type has been more widely used, because the coil winding work is carried out on the outside and the windings are then inserted around each tooth, thus it is possible to accomplish easier automation than the distributed winding type.

In addition, the conventional multiphase BLDC motors of the concentrated winding type require current torque to be highly generated through a high input current for high-speed operation. Moreover, the conventional multiphase BLDC motors of the concentrated winding type that are constructed in series connection are designed so that coils constituting individual phases are connected in series. Therefore, there are drawbacks in that all BLDC motors have a high resistance value, thus limiting the quantity of input current to a lower level, which makes it more difficult to generate high torque and to operate at a high speed.

FIG. 1A is a schematic view depicting series connection of a BLDC motor having an outer rotor configuration according to the prior art FIG. 1B is a schematic view depicting series connection of a BLDC motor having an inner rotor configuration according to the prior art, and FIG.

1C shows an equivalent circuit of an A-phase winding in case of the series connection as in FIGS. 1A and 1B.

In a typical BLDC motor, the rotor is made up of a permanent magnet, and the stator is designed so that a coil is wound around a continuous arrangement of teeth and slots. Here, when the rotor is arranged on the outside of the stator, it is called an outer rotor structure. And, when the rotor is arranged on the inside of the stator, it is called an inner rotor structure.

Referring to FIGS. 1A and 1B, the stator 12 consists of nine teeth 13 and nine slots 14. The nine teeth 13 are wound, as in the concentrated winding type of stator, in such a manner that a coil 15 is wound around each three teeth in a sequence of A phase, B phase and C phase, each of which is connected in series. In this series connection, its equivalent circuit is configured as shown in FIG. 1C so that three resistance components $R_1$, $R_2$ and $R_3$ are connected with each other in series and resistance $R_{\_A}$ is relatively low. Therefore, there is a difficulty in driving the BLDC motor at a high speed due to a restriction of driving current. Specifically, a resistance loss is generated in proportion to $I^2R$, and thus a coil making up each phase is connected in series and has a high resistance value. Therefore, the multiphase BLDC motor of the concentrated winding type constructed in series connection makes it difficult to operate with a high efficiency due to a high resistance loss. In addition, the multiphase BLDC motor of the concentrated winding type constructed with series connections must be constructed for a plurality of coils making up each phase to be connected in series, so that coil winding work must be carried out after all the cores are completely assembled. For this reason, the conventional BLDC motor having a series connection is not suitable for an automation process, so that it has a low productivity. Moreover, even BLDC motors manufactured through the same process have different properties.

As shown in FIG. 2, a switching circuit for driving the stator with three phases, for example A-phase, B-phase and C-phase, requires four switching devices Q1 to Q4 per phase. Examples widely used for the switching devices Q1 to Q4 are power semiconductors, such as Integrated Gate Bipolar Transistors (IGBTs), Metal-Oxide Semiconductor Field Effect Transistors (MOSFETs), Field Effect Transistors (FETs) and so forth.

Referring to FIG. 2, in an H-bridge 202 for the A-phase, each of the switching devices Q1 to Q4 is controlled according to driving signals A1+, A1−, A2+ and A2−. In an H-bridge 203 for the B-phase, each of the switching devices Q1 to Q4 is controlled according to driving signals B1+, B1−, B2+ and B2−. In an H-bridge 204 for the C-phase, each of the switching devices Q1 to Q4 is controlled according to driving signals C1+, C1−, C2+ and C2−.

In the BLDC motor constructed as the foregoing, gate driving signals for controlling the on/off state of each switching device Q1 to Q4 are generated. When the H-bridges are operated, Pulse Width Modulation (PWM) signals are applied to two of the four switching devices so as to turn on/off two switching devices in an alternate manner with respect to each other. In other words, by setting the driving signals A1+ and A1− in the N-pole position of the rotor to be in a high state at the same time and then turning the first and fourth switching devices Q1 and Q4 on, the current path in the H-bridges runs in a counterclockwise cross direction. In contrast, by setting the driving signals A2+ and A2− in the S-pole position of the rotor to be in a high state at the same time and then turning the second and third switching devices Q2 and Q3 on, the current path in the H-bridges runs in a clockwise cross direction. A dead time is set for not maintaining the driving signals A1+ and A1− and the driving signals A2+ and A2− in a high state at the same time.

The switching circuit needs four switching devices so as to drive one phase. Therefore, the BLDC motor needs 4*K number of power switching devices to be driven for a certain magnitude and direction of phase current, thus increasing production costs.

SUMMARY OF THE INVENTION

Therefore, the present invention has been made in view of the above-mentioned problems, and it is an object of the present invention to provide a brushless DC motor and a circuit for controlling the same, capable of allowing for a reduction of switching devices in a control circuit by independently controlling all the phases, each of which is independently wound.

It is another object of the present invention to provide a brushless DC motor with a shunt connection configuration, capable of performing high velocity operation and high torque operation at a low voltage by providing each phase with shunt or parallel connection.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF PREFERRED EMBODIMENTS

In order to accomplish the first object, there is provided a brushless DC motor, comprising: a rotor made up of a permanent magnet with M number of poles; and a stator operating in K number of phases by means of windings wound on N number of teeth, wherein the windings for the K phases wound on the teeth are independently connected with each other, and are supplied with separate power supply voltages through a switching section so as to perform an independent control. A circuit for controlling a brushless DC motor of the present invention is characterized in that the switching section includes a plurality of upper switching devices and a plurality of lower switching devices connected with each other in series; the power supply voltages comprise a lower power supply voltage for supplying one power supply voltage in common through the lower switching devices and K number of upper power supply voltages for supplying a plurality of power supply voltages in separation through the upper switching devices; and each of the plurality of windings is independently connected between a common joint between the upper and lower switching devices, and a common joint between the lower power supply voltage and the plurality of upper power supply voltages.

In order to accomplish the second object, there is provided a brushless DC motor, comprising: a rotor made up of a permanent magnet with M number of poles; and a stator including N number of teeth and slots wound by a plurality of windings, wherein the plurality of windings having the same excitation phases wound on the teeth are each maintained in shunt connection so as to improve driving torque and rotational speed.

Hereinafter, the preferred embodiments of the present invention will be described in detail with reference to the drawings.

Figure 3:
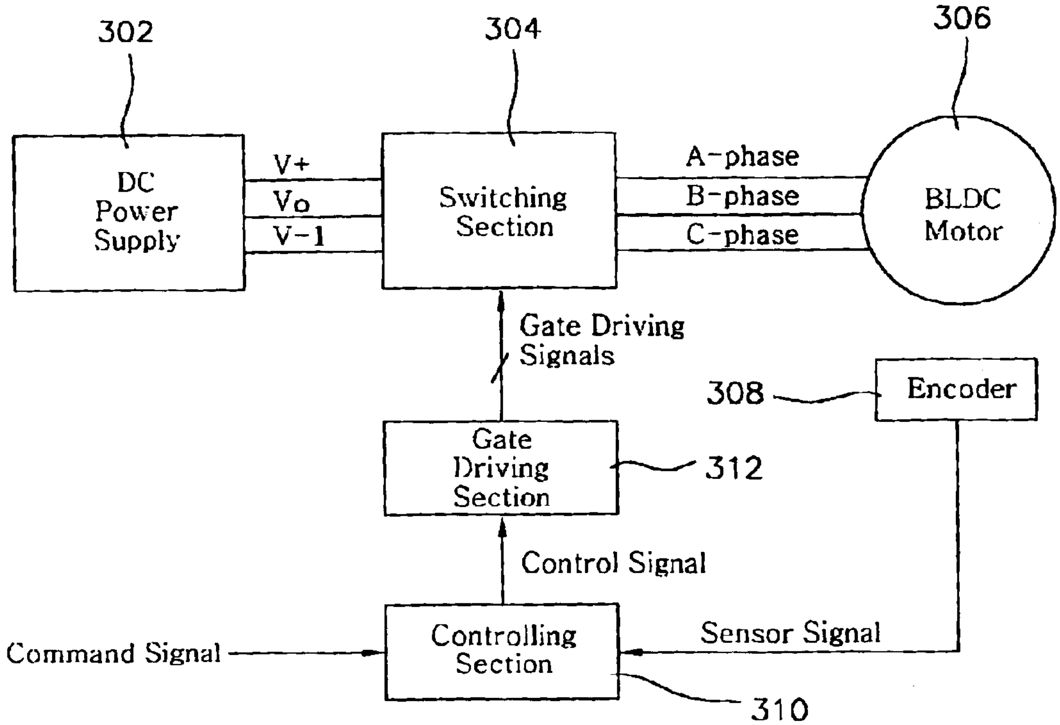
FIG. 3 is a block diagram for controlling a BLDC motor of the present invention.

As shown in FIG. 3, the configuration for controlling a brushless DC (BLDC) motor of the present invention comprises a DC power supply 302, a switching section 304, a BLDC motor 306, an encoder 308, a controlling section 310, and a gate driving section 312.

Referring to FIG. 3, the DC power supply 302 supplies various power supply voltages, such as V+, Vo and V−, which the switching section 304 requires. The switching section 304 includes a plurality of lower and upper switching devices, in which the lower switching devices are capable of supplying a single power supply voltage (e.g., V+) in common, but the upper switching devices have to separately supply a plurality of power supply voltages. For example, in the case of k phases, the upper switching devices require k+1 the power supply voltages.

The switching section 304 is implemented as two power switching semiconductor devices, which are connected with each other in series, as described below. The switching section 304 applies each power supply voltage of the DC power supply 302 to a plurality of windings of the stator of the BLDC motor 306 according to gate driving signals.

The BLDC motor 306 according to the present invention is designed so that a rotor is made up of a permanent magnet and a stator is made up of an armature with a plurality of windings wound around a core. As described below, the BLDC motor 306 can be implemented as either an outer rotor structure or an inner rotor structure. The stator is constructed so that at least one coil is wound around a continuous arrangement of teeth and slots. Then, the stator includes a connection of a concentrated winding type, and generates a magnetic field according to electric current applied through the switching section 304, and thus interacting with magnetic field of the rotator made up of the permanent magnet to rotate the rotor. This BLDC motor 306 is typically called a N-phase M-pole BLDC, where N is the number of slots in the stator, and M is the number of poles in the permanent magnet. Here, it is preferred to distinguish between an electrical phase K for controlling the BLDC motor, an excitation phase J formed by winding around a plurality of teeth and slots in series or in parallel so as to form a single identical electrical phase, and a mechanical phase N indicating the number of teeth and slots. However, "phase" as referred to in the preferred embodiment of the present invention means the electrical phase only and specifically, as long as another type of phase is not referred to in particular.

When the BLDC motor rotates, a pole position is sensed by a hall sensor or an optical sensor (not shown), and simultaneously a rotational speed is sensed by the encoder 308. The sensed results are sent to the controlling section 310. This controlling section outputs control signals using command signals and sensor signals so as to rotate the BLDC motor at a desired speed.

The gate driving section 312 receives the control signals from the controlling section 310, and sequentially creates gate driving signals for driving power semiconductor devices constituting the switching section 304, and then applies the gate driving signals to respective gates of the power semiconductor devices of the switching section.

Figure 4A:
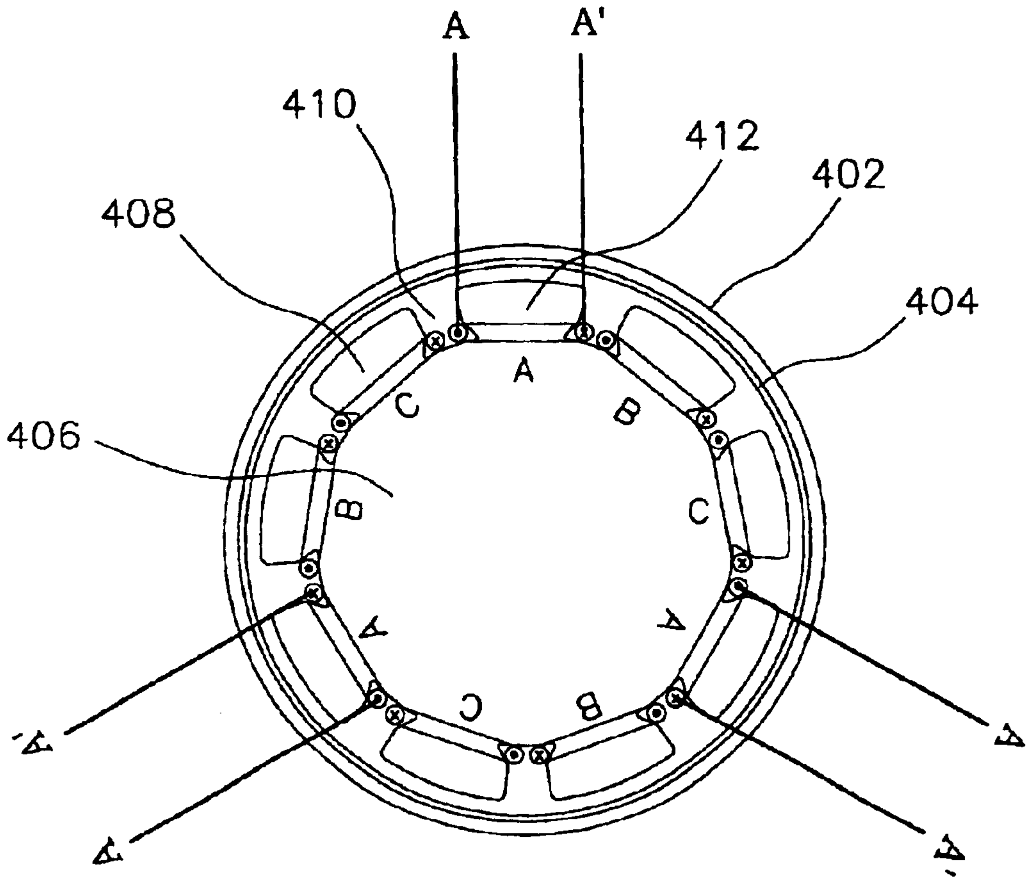
FIG. 4A is a schematic view depicting shunt connection of a BLDC motor having an outer rotor configuration according to the present invention.
Figure 4B:
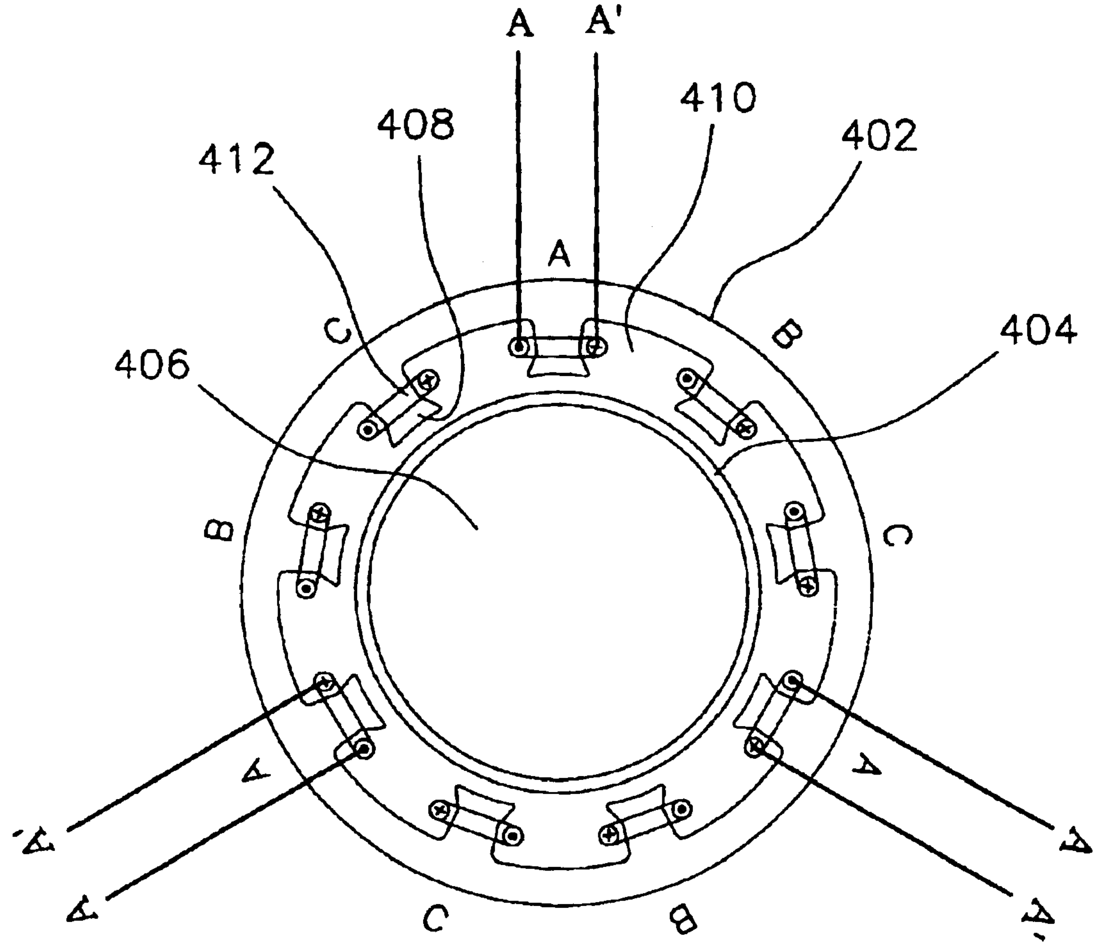
FIG. 4B is a schematic view depicting shunt connection of a BLDC motor having an inner rotor configuration according to the present invention.
Figure 4C:
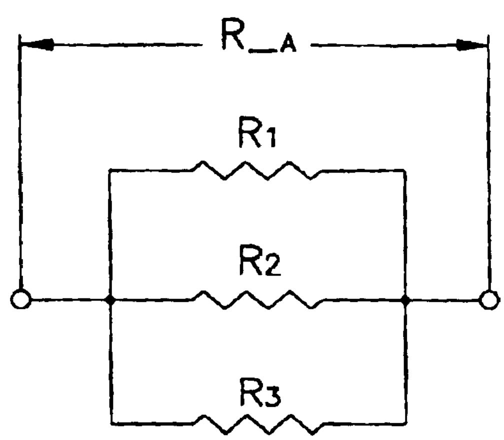
FIG. 4C shows an equivalent circuit of A-phase winding in case of the series connection as in FIGS. 4A and 4B.

FIG. 4A is a schematic view depicting a shunt connection of a BLDC motor having an outer rotor structure according to the present invention, FIG. 4B is a schematic view depicting a shunt connection of a BLDC motor having an inner rotor structure according to the present invention, and FIG. 4C show an equivalent circuit of the shunt connection of A-phase according to the present invention.

Referring to FIGS. 4A and 4B, a BLDC motor includes a rotor 404 and a stator 406, which are arranged in a case 402. The stator 406 is designed so that windings 412 for each phase are connected in parallel and are wound around each tooth 408 and through each slot 410. This shunt connection is an equivalent circuit in that resistances $R_1$, $R_2$ and $R_3$ of each winding are connected in parallel as shown in FIG. 4C, and thus it will be seen that the total resistance $R_{\_A}$ becomes lower. According to this configuration of the present invention, coils constituting each phase of the BLDC motor are connected in parallel, so that a resistance value per phase can be maintained at a low level. Therefore, the BLDC motor of the present invention has a low exothermic quantity caused by resistance loss, and a resulting high efficiency, thereby enabling the BLDC motor to accomplish a low voltage and high velocity operation, and to accomplish a low voltage and high torque operation.

In this BLDC motor, an optimal pole number ratio of the stator to the rotor is 3*j:2*k, where j is number of excitation phases for supplying electric current to the windings of the stator at the same time, k is a positive integer, and 3*j is larger than 2*k. The optimal length of the teeth is $2\pi$*j/(pole number of the rotor*N).

Figure 5:
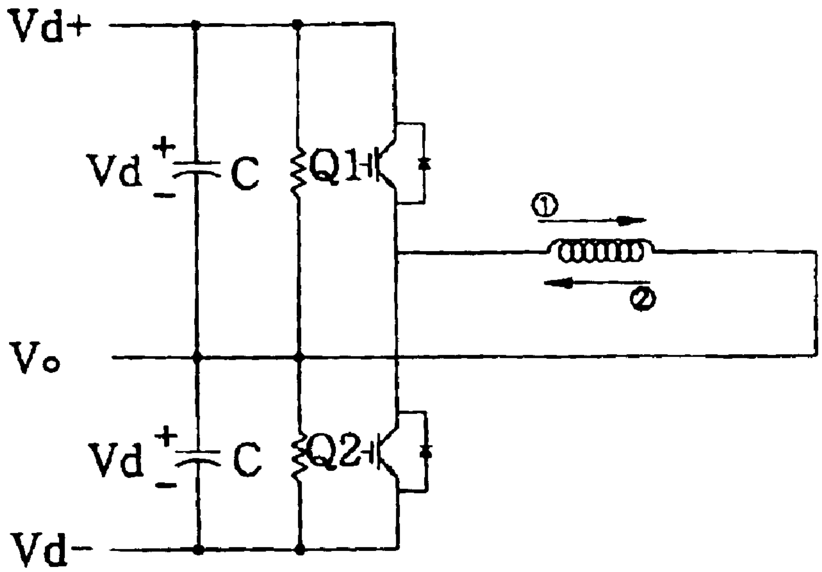
FIG. 5 is a switching circuit diagram according to the present invention.

FIG. 5 is a circuit diagram of a switching section according to the present invention, which is for one phase. A switching section for applying electric current to windings, which are wound around each tooth of the stator in parallel, according to driving signals, includes two power switching semiconductor devices Q1 and Q2, which are connected with each other in series.

Referring to FIG. 5, two power supply voltages, Vd+ and Vd−, are supplied in series, and an upper switching device Q1 and a lower switching device Q2 are also connected with each other in series. At least one winding, which is wound around the teeth of the stator, is connected between a common switching joint between the two switching devices Q1 and Q2, and a common voltage joint Vo, between two power supply voltages.

In this circuit, when gate driving signals cause the upper switching device Q1 to turn on and the lower switching device Q2 to turn off, electric current caused by the power supply voltage, Vd+, flows through a drain and a source of the upper switching device Q1 to the coil in a direction of the arrow Ⓡ. However, when gate driving signals cause the lower switching device Q2 to turn on and the upper switching device Q1 to turn off, electric current flows from the common switching joint Vo through the coil (the direction of the arrow Ⓒ) to a drain and a source of the lower switching device Q2.

This switching circuit according to the present invention is capable of controlling the direction of electric current flowing to a coil by means of two power only semiconductor devices for one phase, and thus the number of parts for use in a control circuit can be reduced as a whole, together with costs of production. Here, it should be noted that when the switching section is made up of K number of arms so as to drive K number of phases, lower switching devices of each arm are capable of supplying power using one power supply voltage Vd+, but upper switching devices require each separate power supply voltage, and the resulting K+1 number of powers as a whole. Additionally, windings of each phase must be independent of each other, and thus they should be individually connected to the corresponding power supply voltage.

Figure 6:
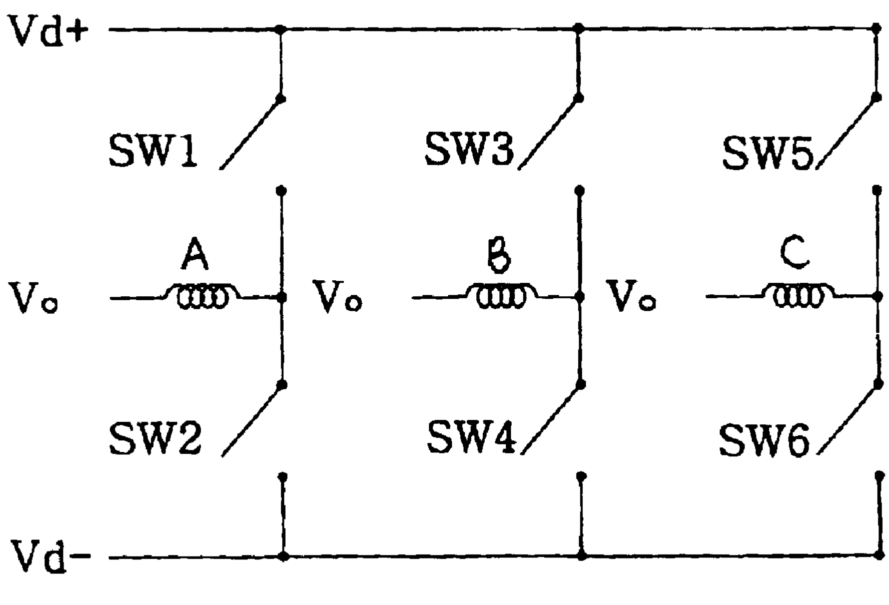
FIG. 6 is a schematic view for illustrating an independent multiphase control principle according to the present invention.

FIG. 6 is a schematic view for illustrating an independent multiphase control principle according to the present invention.

Referring to FIG. 6, for the present invention, three coils (three phases) A, B and C are independently wound with respect to each other, and are intended to supply power by controlling six switches SW1 to SW6. Specifically, in coil A, when a first switch SW1 turns on and a second switch SW2 turns off, electric current flows from Vd+ through the first switch SW1 to Vo. However, when the second switch SW2 turns on and the first switch SW1 turns off, electric current flows from Vo through the second switch SW2 to Vd−. In coil B, when a third switch SW3 turns on and a fourth switch SW4 turns off, electric current flows from Vd+ through the third switch SW3 to Vo. By contrast when the fourth switch SW4 turns on and the third switch SW3 turns off, electric current flows from Vo through the fourth switch SW4 to Vd−. Finally, in coil C, when a fifth switch SW5 turns on and a sixth switch SW6 turns off, electric current flows from Vd+ through the fifth switch SW5 to Vo. By contrast, when the sixth switch SW6 turns on and the fifth switch SW5 turns off, electric current flows from Vo through the sixth switch SW4 to Vd−. According to this configuration of the present invention, each phase is operated with an independent power, and thus electric current of each phase can be controlled independently.

FIG. 7 is a schematic diagram illustrating a procedure for controlling a motor independently, in which the motor includes a stator with six slots (teeth) and a rotor with two poles.

Figure 7A:
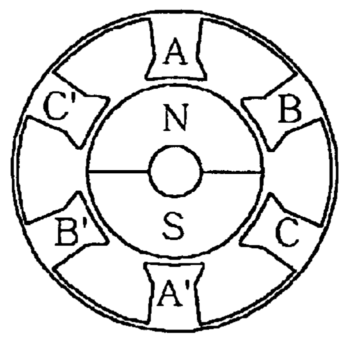
FIGS. 7A and 7B are schematic diagrams illustrating a procedure for controlling a BLDC motor in which the ratio of stator phase to rotor pole is 6:2.

Referring to FIG. 7, a stator shown in FIG. 7A is designed so that six windings, indicated as A, B, C, A', B' and C', are individually wound around the corresponding teeth, and are each supplied with powers through the aforementioned switching circuit. A rotor arranged in the stator is made up of a permanent magnet having one N-pole and one S-pole.

Figure 1A:
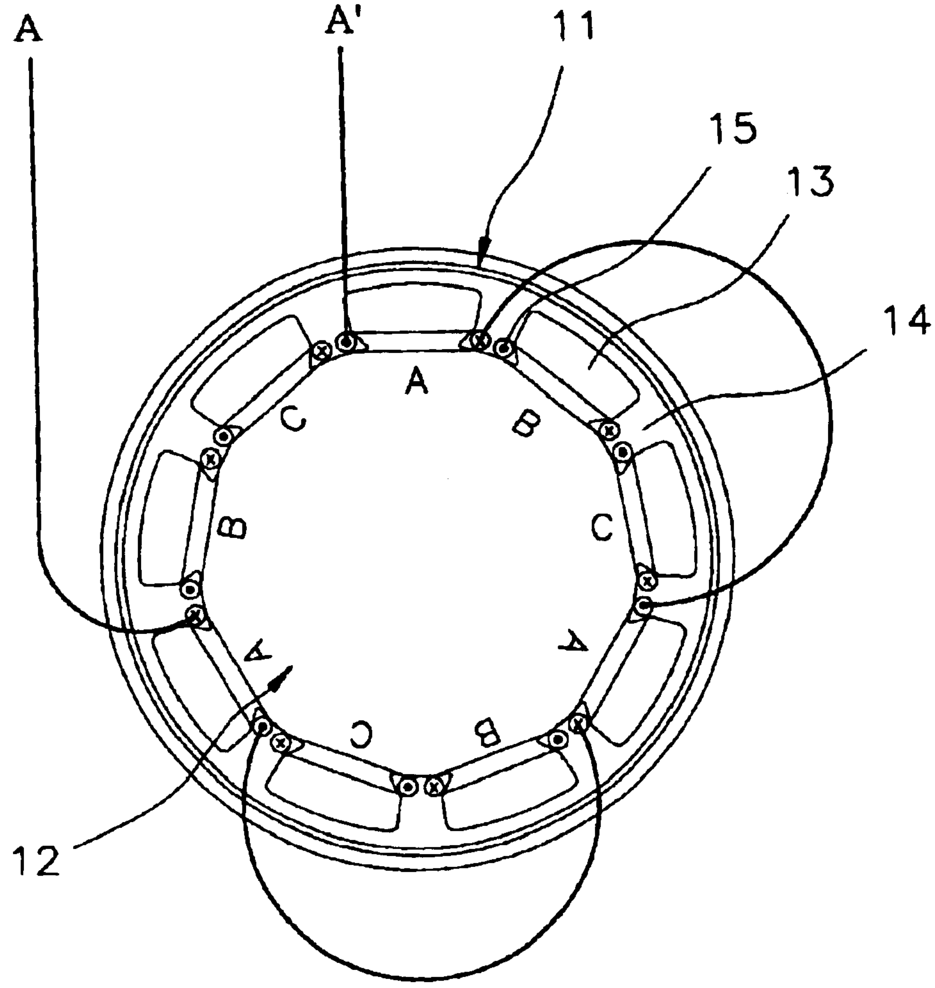
FIG. 1A is a schematic view depicting series connection of a BLDC motor having an outer rotor configuration according to the prior art.
Figure 1B:
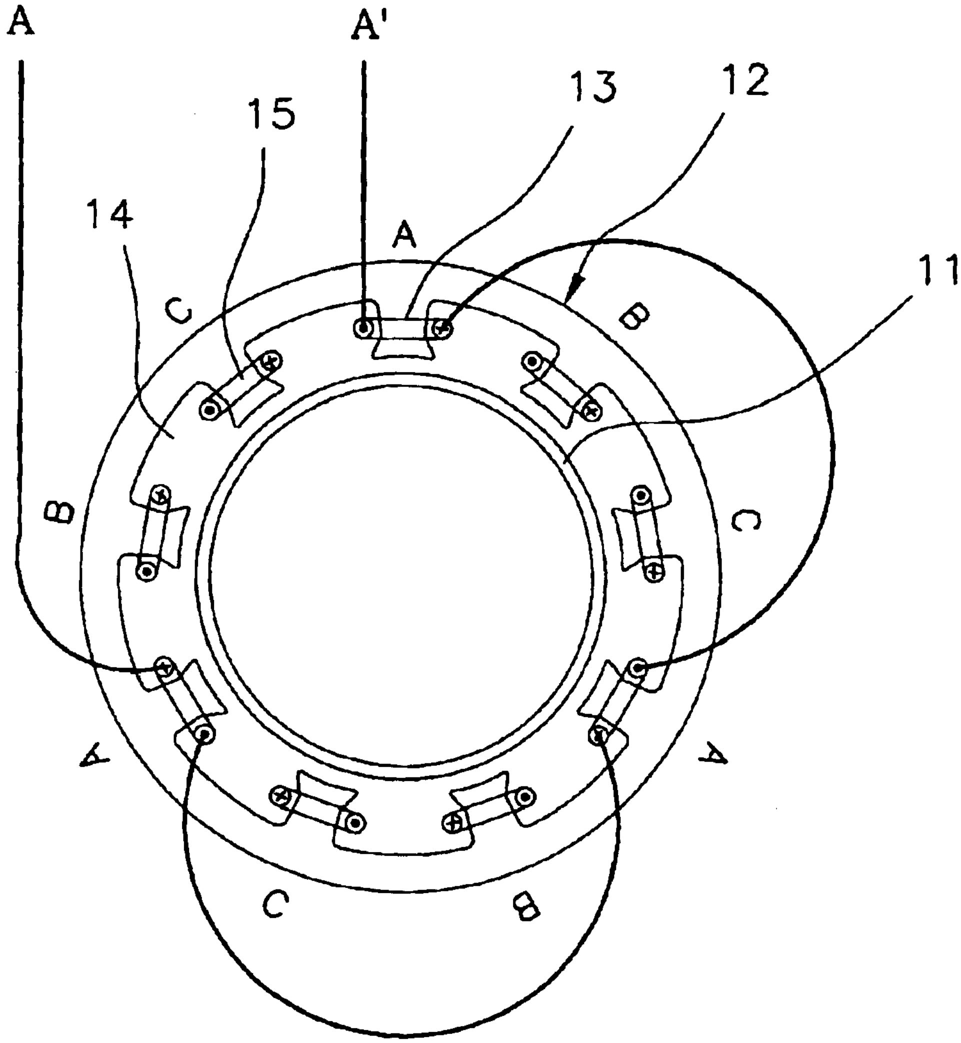
FIG. 1B is a schematic view depicting series connection of a BLDC motor having an inner rotor configuration according to the prior art.
Figure 1C:
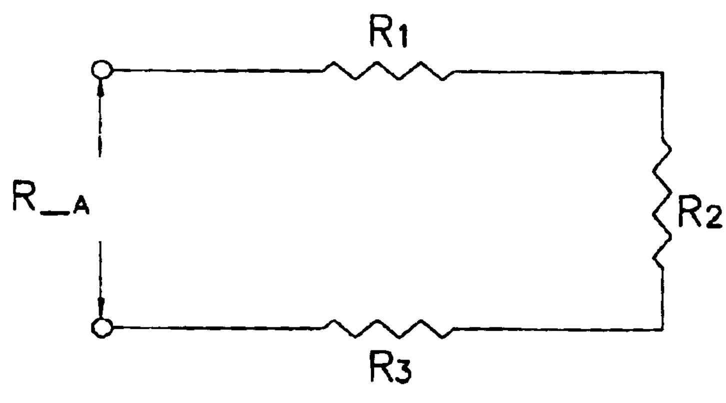
FIG. 1C shows an equivalent circuit of A-phase winding in the series connections in FIGS. 1A and 1B.
Figure 2:
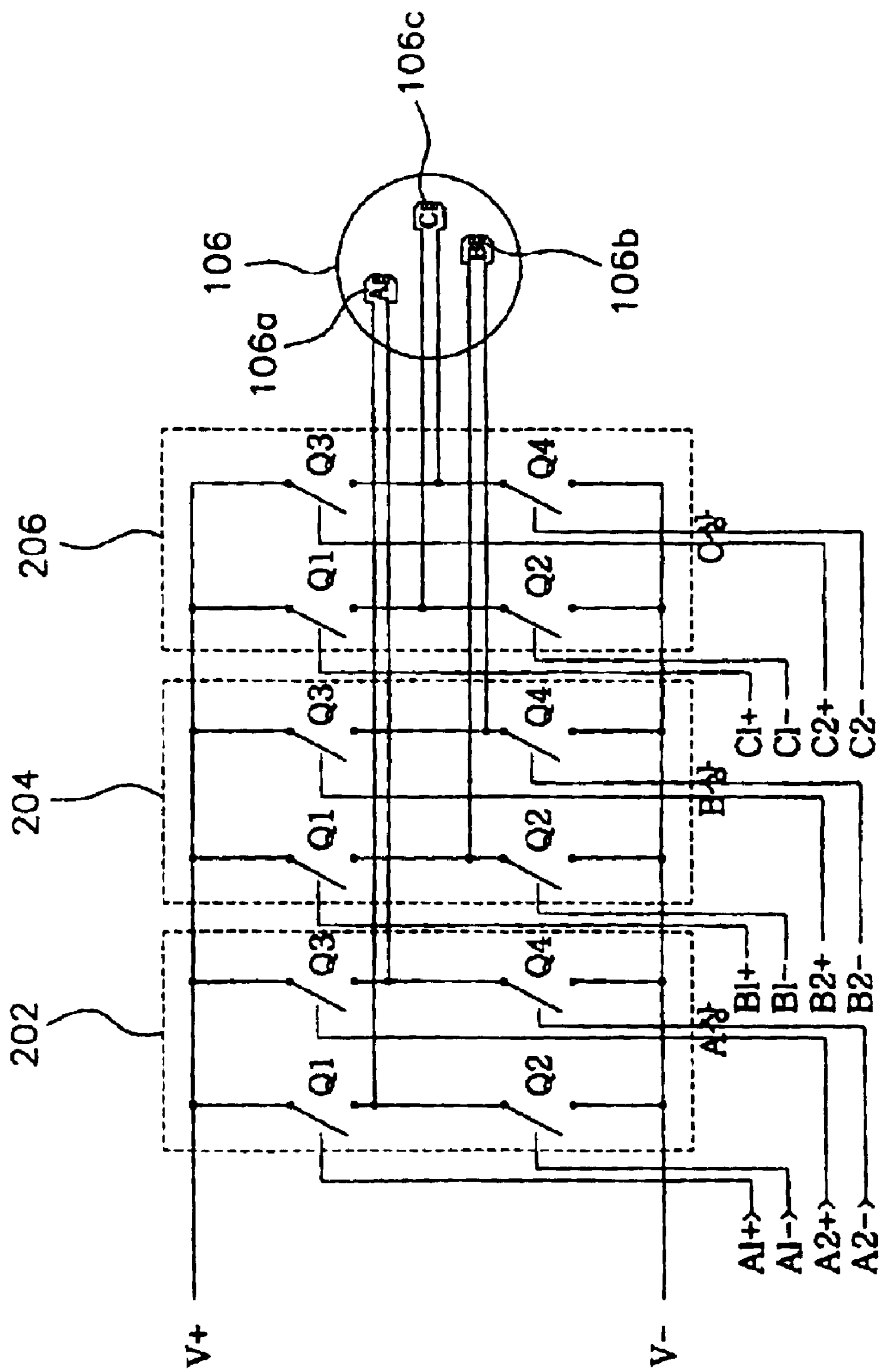
FIG. 2 is a switching circuit diagram for supplying electric current to a stator of a multiphase BLDC motor according to the prior art.

Here, it should be noted that in order to perform independent control, windings constituting each phase are irrelevant to whether they are connected in series or in parallel, and windings for each phase must be connected independently. As mentioned above, FIG. 1C shows the windings for A-phase, which are connected in series, FIG. 4C shows the windings for A-phase which are connected in parallel. For independent control according to the present invention, it is of little importance whether the windings for A-phase are connected in series or in parallel, but the A-phase and the B-phase are independently connected with each other and must be connected to separate power supply voltages.

Figure 7B:
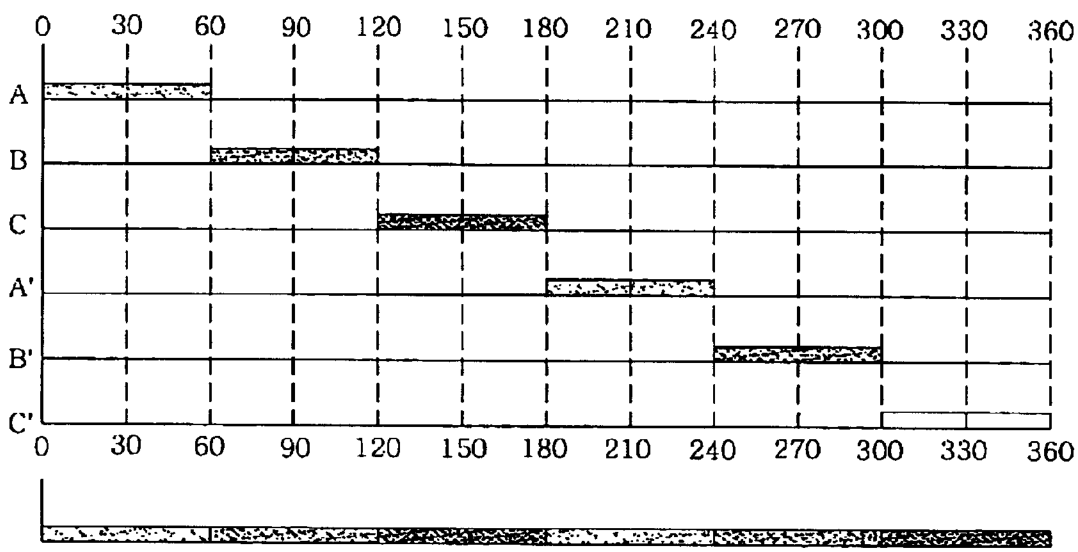

In order to control the motor constructed as the forgoing, electric current is sequentially applied for each winding in a sequence of A, B, C, A', B' and C', as shown in FIG. 7B, so as to rotate the rotor. In the graph, the transverse axis represents an angle while the rotor rotates one turn (360 degrees), and the longitudinal axis represents each winding. It shows that when the corresponding winding is in a high state, current is applied to generate torque. At the bottom of the graph, the sum of the total torque is given.

As shown, torque is generated by the A-winding at a range from 0° to 60°, by the B-winding at a range from 60° to 120°, and by the C-winding at a range from 120° to 180°. Also, torque is generated by the A'-winding at a range from 180° to 240°, by the B'-winding at a range from 240° to 300°, and by the C'-winding at a range from 300° to 360°.

In the controlling section 310, driving signals for applying current to each winding in this order are generated and then outputted to the gate driving section 312. Then, in the gate driving section 312, the corresponding switching device is turned on/off to apply current to the corresponding winding, so that rotation of the BLDC motor can be controlled.

FIG. 8 is a schematic diagram illustrating a procedure for controlling a BLDC motor according to the present invention, in which the BLDC motor includes a stator with six slots (teeth) and a rotor with four poles.

Figure 8A:
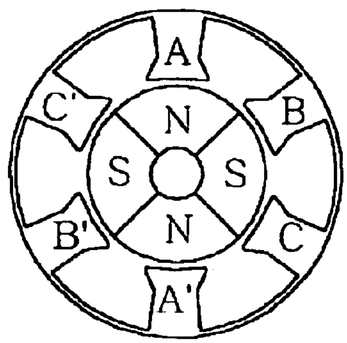
FIGS. 8A and 8B are schematic diagrams illustrating a procedure for controlling a BLDC motor in which the ratio of stator phase to rotor pole is 6:4.

Referring to FIG. 8, a stator shown in FIG. 8A is designed so that six windings indicated as A, B, C, A', B' and C' are wound around the corresponding teeth, and are each supplied with powers through the aforementioned switching circuit A rotor arranged in the stator is made up of two permanent magnets, each of which consists of one N-pole and one S-pole.

Figure 8B:
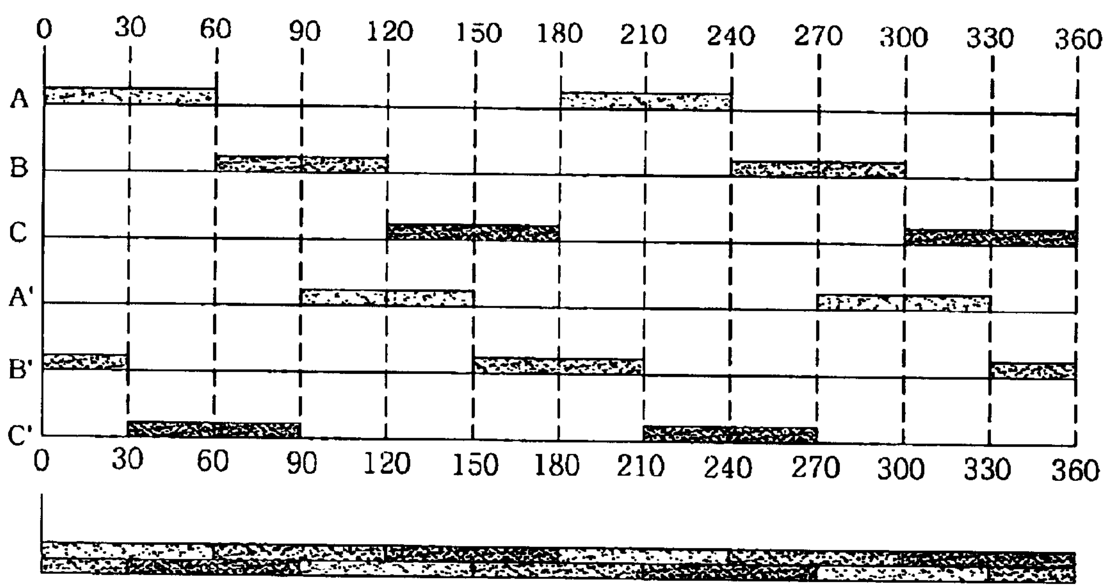

In order to control the BLDC motor constructed as the forgoing, electric current is sequentially applied to each winding in a sequence of A, B, C, A', B' and C', as shown in FIG. 8B, so as to rotate the rotor. In the graph, the transverse axis represents the angle of the rotor while the rotor rotates one turn (360°), and the longitudinal axis represents each winding. It shows that when the corresponding winding is in a high state, current is applied to generate torque. At the bottom of the graph, the sum of the total torque is given.

As shown in FIG. 8, each phase is driven twice for a uniform interval. Torque is generated as current flows in the A-phase at both ranges from 0° to 60° and from 180° to 240°, in the B-phase at both ranges from 60° to 120° and from 240° to 300°, and in the C-phase at both ranges from 120° to 180° and from 300° to 360°. Similarly, torque is generated as current flows in the A'-phase at both ranges from 90° to 150° and from 270° to 330°, in the B'-phase at both ranges from 330° to 30° and from 150° to 210°, and in the C'-phase at both ranges from 30° to 90° and from 210° to 270°.

FIG. 9 is a schematic diagram illustrating a procedure for controlling a BLDC motor according to the present invention, in which the motor includes a stator with six slots (teeth) and a rotor with six poles.

Figure 9A:
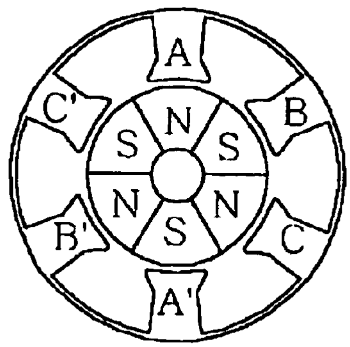
FIGS. 9A and 9B are schematic diagrams illustrating a procedure for controlling a BLDC motor in which the ratio of stator phase to rotor pole is 6:6.
Figure 9B:
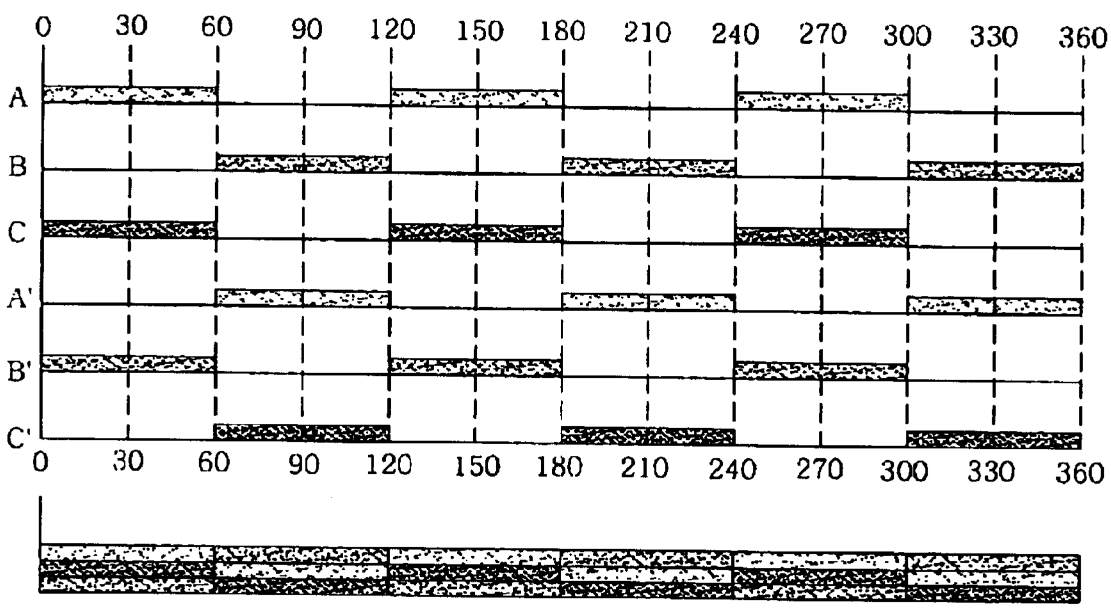

Referring to FIG. 9, a stator shown in FIG. 9A is designed so that six windings, indicated as A, B, C, A', B' and C', as shown in FIG. 9B, are wound around the corresponding teeth, and are supplied with individual power through the aforementioned switching circuit A rotor arranged in the stator is made up of three permanent magnets, each of which consists of one N-pole and one S-pole.

As shown in FIG. 9, each phase is driven three times for a uniform interval. Torque is generated as current flows in the A-phase at three ranges from 0° to 60°, from 120° to 180° and from 240° to 300°, in the B-phase at thee ranges from 60° to 120°, from 180° to 240° and from 300° to 360°, and in the C-phase, as the same as A-phase, at three ranges from 0° to 60°, from 120° to 180° and from 240° to 300°. Also, torque is generated as current flows in the A'-phase, as the same as B-phase, at three ranges from 60° to 120°, from 180° to 240° and from 300° to 360°, in the B'-phase, as same as the C-phase, at three ranges from 0° to 60°, from 120° to 180° and from 240° to 300°, and in the C'-phase, as same as the A'-phase, at both at three ranges from 60° to 120°, from 180° to 240° and from 300° to 360°.

As can be seen from the foregoing, the driving circuit of a multiphase permanent magnet motor of a concentrated winding type having K number of independent windings needs 2*K number of power switching devices so as to cause electric current inputted into each phase to adjust in a certain magnitude and direction, and needs K+1 number of independent power supply voltages so as to drive the power switching devices. Therefore, the present invention is capable not only of accomplishing a cost-effective control circuit, but also of performing an independent multiphase control which makes it possible to freely control the magnitude and direction of the electric current in each phase, thus providing a simple control circuit and control algorithm. In addition, it is possible to perform a low-voltage, high-speed operation and a low-voltage, high-torque operation by making stator windings constituting each separate phase to become parallel windings.

The BLDC motor of the present invention is constructed in a concentrated winding type so that it can be expected to reduce torque ripple only through adjustment in length of teeth, to have a high efficiency, and to free from vibration. Moreover, the driving circuit is constructed using at least switching devices, so that an improvement in reliability can be expected.

What is claimed:

1. In an apparatus in which a switching part allows a power of a DC power part to be applied to a brushless DC motor comprising a rotor comprised of a permanent magnet of M pole, a stator provided with N number of teeth wound by coils and operated in K-phase, a control circuit of an independent multi-phase brushless DC motor being characterized in that the stator is constructed such that windings of K-phase wound on the teeth are independently connected, the DC power comprising of a power Vd+, Vo that is voltage-divided by an upper condenser (C) for applying power to upper switching devices and a resistance, and the Vd+, Vo corresponding to half of the DC power, and a power Vo, Vd− that is voltage-divided by a lower condenser for applying power to lower switching devices and a resistance, and corresponding to half of the DC power, K number of independent ground terminals Vo corresponding to common connection points of the cathode of the upper condenser and the anode of the lower condenser are provided, the switching part comprising an upper switching device of which one end is connected to the power Vd+, Vo, and a lower switching device of which one end is connected to the power Vo, Vd−, the upper switching device and the lower switching device being connected in series, the windings of respective phases being independently connected between a serial connection point of the two switching devices and the ground and the ground terminal Vo, and when the upper switching device is turned on, a current by the voltage of Vd− flows to Vo via the turned-on upper switching device and a corresponding winding, and when the lower switching device is turned on, the voltage of Vo flows to Vd− through the lower switching device.

2. In an independent multiphase brushless DC motor constructed to be independently controllable by a switching part and comprising a rotor comprised of a permanent magnet of M pole, a stator having K-phase windings formed by coils wound on N number of teeth and independently connected with each other, in which the windings of independent exciting phase are respectively connected in parallel, when assuming that j is a number of excitation phases for applying current to the stator at the same time and k is an arbitrary natural number, an optimal ratio of pole number of the rotator to pole number of the stator is 2*k to 3*j, and 3*j is greater than 2*k.

* * * * *